US012570406B2

(12) United States Patent
Edwards

(10) Patent No.: US 12,570,406 B2
(45) Date of Patent: Mar. 10, 2026

(54) AIRCRAFT STRUCTURE

(71) Applicant: Airbus Operations Limited, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 19/226,668

(22) Filed: Jun. 3, 2025

(65) Prior Publication Data

US 2025/0368347 A1 Dec. 4, 2025

(30) Foreign Application Priority Data

Jun. 4, 2024 (GB) ...................................... 2407924

(51) Int. Cl.
B64D 37/00 (2006.01)
(52) U.S. Cl.
CPC .................................. B64D 37/005 (2013.01)
(58) Field of Classification Search
CPC ...... B64D 37/005; B64D 37/06; B64D 37/08; B64D 37/10; B64D 37/30; F17C 2203/0329; F17C 2227/044; Y02E 60/32
See application file for complete search history.

(56) References Cited

U.S. PATENT DOCUMENTS

| | | | |
|---|---|---|---|
| 3,561,639 A | 2/1971 | Allen | |
| 4,352,851 A | 10/1982 | Heitz et al. | |
| 8,043,759 B2 | 10/2011 | Zhang et al. | |
| 10,461,344 B2 | 10/2019 | Xiang | |
| 11,571,595 B2 | 2/2023 | Damazo et al. | |
| 2014/0124074 A1 | 5/2014 | Henry | |
| 2015/0337730 A1 | 11/2015 | Kupiszewski et al. | |
| 2017/0073079 A1 | 3/2017 | Williams | |
| 2023/0027471 A1 * | 1/2023 | Beier ..................... B64D 37/08 |
| 2023/0127600 A1 | 4/2023 | Soulie | |

FOREIGN PATENT DOCUMENTS

| | | | |
|---|---|---|---|
| DE | 102021208254 A1 | 2/2023 | |
| EP | 3120900 A1 * | 1/2017 | .............. A62C 3/08 |
| EP | 4147978 A1 | 3/2023 | |
| GB | 1341693 A | 12/1973 | |
| GB | 1445832 A | 8/1976 | |
| GB | 1454492 A | 11/1976 | |
| JP | 2017095095 A | 6/2017 | |

OTHER PUBLICATIONS

Search Report and Examination Report corresponding to GB 2407924.6, dated Dec. 2, 2024, 5 pages.

* cited by examiner

*Primary Examiner* — Valentina Xavier
(74) *Attorney, Agent, or Firm* — Sterne, Kessler, Goldstein & Fox P.L.L.C.

(57) ABSTRACT

Disclosed is an aircraft structure comprising at least one aircraft structural element defining a volume; a fuel-handling component arranged within the volume and configured to handle a fuel; a purging system comprising an inlet and an outlet, the purging system configured to provide a flow of purge gas from the inlet, through the volume, to the outlet, to thereby purge leaked fuel from the volume; and a flow guide member formed of a reticulated foam, arranged within the volume and externally to the fuel-handling component, and configured to guide the flow of purge gas within the volume. An aircraft comprising the aircraft structure is also disclosed.

18 Claims, 4 Drawing Sheets

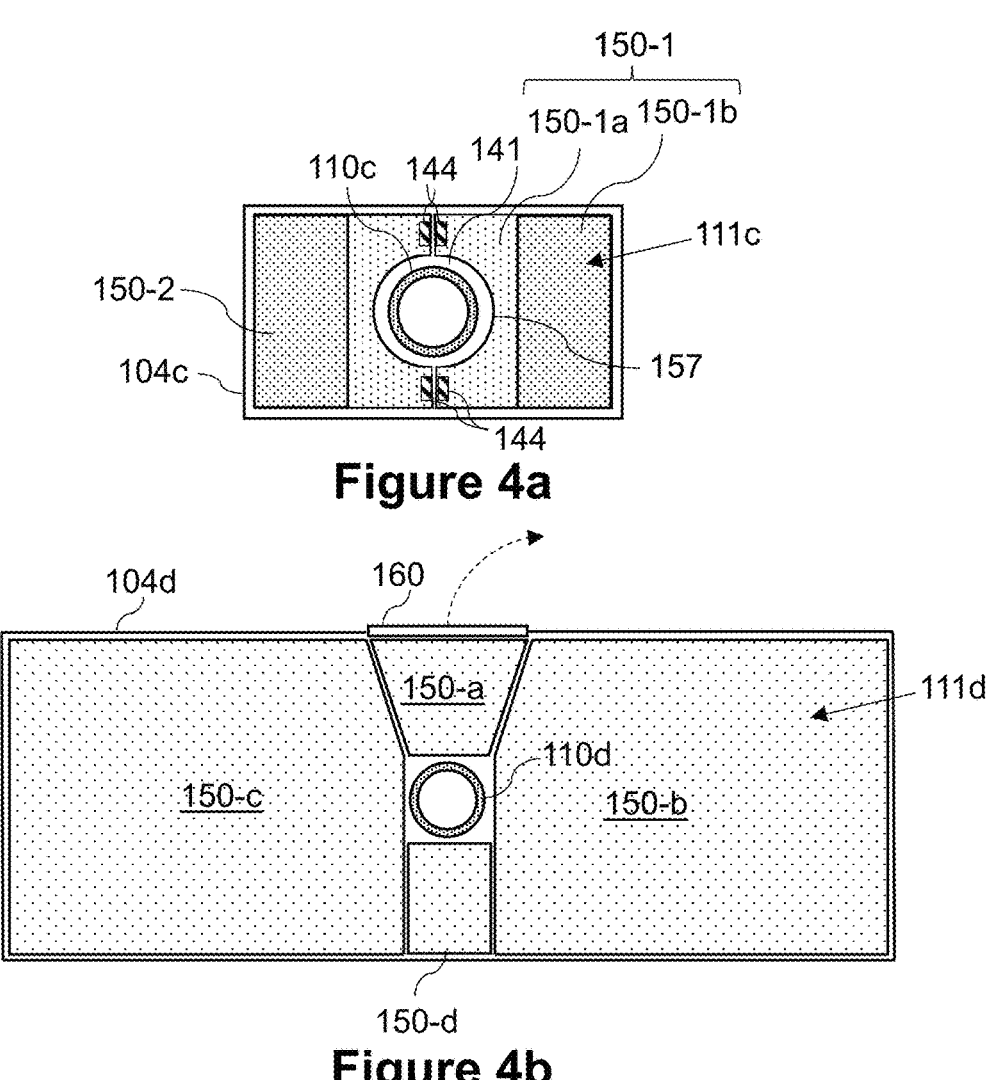
Figure 4a
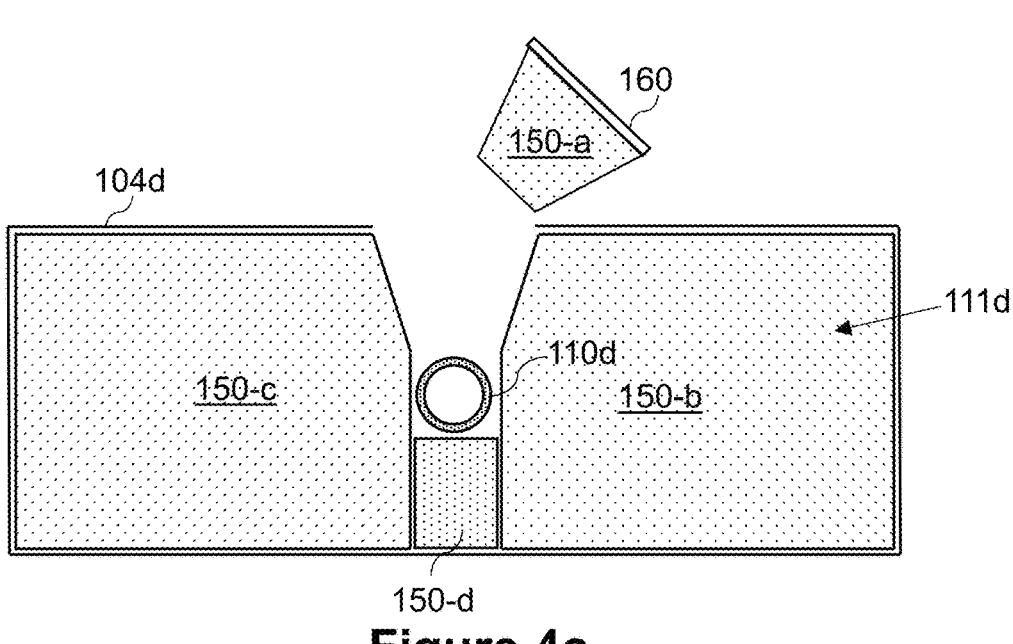
Figure 4b
Figure 4c

AIRCRAFT STRUCTURE

TECHNICAL FIELD

The present invention relates to aircraft structures, and more specifically to aircraft structures related to fuel-handling.

BACKGROUND

Fuel-handling systems are necessary on aircraft to provide power for propulsion. However, fuel is inherently combustible and so presents an undesirable ignition risk.

SUMMARY

A first aspect of the present invention provides an aircraft structure comprising: at least one aircraft structural element defining a volume; a fuel-handling component arranged within the volume and configured to handle a fuel; a purging system comprising an inlet and an outlet, the purging system configured to provide a flow of purge gas from the inlet, through the volume, to the outlet, to thereby purge leaked fuel from the volume; and a flow guide member formed of a reticulated foam, arranged within the volume and externally to the fuel-handling component, and configured to guide the flow of purge gas within the volume.

The purging system is operable to purge the volume in which the fuel-handling component is arranged. The purge gas can be air and the purging system can predominantly function to displace leaked substances from the volume. The purge gas can be an inert gas which is not flammable such as nitrogen, for example, and can also function to suppress ignition events. This can remove or otherwise reduce an amount of fuel from the volume, for example fuel which may have unintentionally leaked from the fuel-handling component. This can reduce a risk of an ignition event.

The flow guide member, being configured to guide the flow of purge gas, can increase a rate at which fuel is removed from the volume or otherwise reduced in quantity within the volume by improving a speed or direction of flow, for example. In some examples, the flow guide member directs the purge gas towards regions of the volume in which leaked fuel is more likely to be present, such as regions which are susceptible to accumulation of leaked fuel. For example, the presence of the flow guide member blocks or partially blocks a flow of purge gas to a first region of the volume and diverts or partially diverts the flow of purge gas to a second region of the volume. In some examples, the flow guide member improves a flow velocity of the purge gas, such as an average flow velocity, to bring about a more effective purging of the volume. In some examples, the flow guide member can induce turbulence in a region which, absent such a flow guide member, might be stagnant and be susceptible to leaked fuel accumulation. In some examples, the flow guide member may reduce turbulence in an area such that a flow of purge gas and leaked fuel is removed through the outlet more quickly, for example. Accordingly, provision of a flow guide member can reduce risk of an ignition event.

The flow guide member, in being formed of a reticulated foam, can further reduce risk of an ignition event. Reticulated foams can exhibit flame-suppressant qualities such that, in the event of combustion, energy released is absorbed by the foam structure and flames are arrested. A reticulated foam, as described herein, refers to a porous, solid foam predominantly formed of open cells.

The volume defined by the at least one aircraft structural element is anticipated to be predominantly free of fuel, in that the fuel-handling component is designed to retain fuel within the fuel-handling component, and such that the purging system is for removing relatively low quantities of leaked fuel from the volume. This can be contrasted with aircraft structural elements which are designed to predominantly internally hold and be in contact with fuel, and which house another fuel-handling component.

Optionally, the flow guide member comprises a first portion and a second portion, the first portion formed of a more porous reticulated foam than the second portion. In other words, the first portion has a higher porosity than the second portion. Having different portions of different porosities can allow the behaviour of the flow guide member to be selected based on a balance of flame suppression and flow guidance. For example, a lower porosity may result in a stronger steering of the purge gas flow, whereas a higher porosity may result in better flame suppression. Accordingly, a portion having lower porosity (such as the first portion) may be arranged nearer the purge gas flow. In some examples, the flow guide member comprises a plurality of portions, each portion having different respective porosities. Each portion of the flow guide member may be formed of a different reticulated foam material, or the portions may correspond to porosity varying continuously within a single reticulated foam material.

Optionally, the second portion is arranged nearer the purge gas flow. As described above, this can improve flow guidance of the purge gas flow by providing a stronger steering whilst still facilitating flame suppression.

Optionally, the flow guide member is attached to the aircraft structural element. In some examples, the flow guide member is attached to the aircraft structural element and does not contact the fuel-handling component. In some examples, the flow guide member is reversibly attachable to the aircraft structural element.

Optionally, the flow guide member is attached to the fuel-handling component. In some examples, the flow guide member is reversibly attachable to the fuel-handling component.

Optionally, the flow guide member is configured to be removable from the volume. This can simplify installation of the flow guide member into the volume. Furthermore, this can simplify inspection and maintenance of the aircraft structural element and/or the fuel-handling component. In some examples, the flow guide member is removably attachable to the at least one aircraft structural element and/or the fuel-handling component, for example by a detachable fastener such as Velcro.

Optionally, the flow guide member has a surface which is shaped to be conformal with an exterior surface of the fuel-handling component, and arranged relative to the fuel-handling component such that the flow of purge gas is guided between the surface of the flow guide member and the exterior surface of the fuel-handling component. In other words, the flow guide member has a surface which is substantially identical to an exterior surface of the fuel-handling component, and is spaced apart from the fuel-handling component. This can generate a flow of purge gas between the fuel-handling component and the flow guide member which can improve the rate at which leaked fuel is removed from the volume.

In some examples, the flow guide member has a first surface which is shaped to be conformal with an exterior surface of the fuel-handling component, and a second surface shaped to be conformal with and in contact with an internal surface of the aircraft structural element. This can facilitate the flow guide member being arranged compactly within the volume, whilst providing a suitable purge gas flow path.

Optionally, the flow guide member is arranged to fill a corner region of the volume. A corner region can be a region between boundaries of the volume which are angled with respect to each other. The corner region need not be the corner of a cubic structure, in that the boundaries may not be perpendicular to each other. In any case, corner regions can be more susceptible to stagnant gas flow and leaked fuel may accumulate in corner regions. Accordingly, the flow guide member being arranged to fill such a corner region, and being formed of a reticulated foam, can mean that leaked fuel, such as that moved by purge gas flow, can be diverted away from such regions, and also that flame suppression is provided in such regions.

Optionally, the flow guide member is a first flow guide member of a plurality of flow guide member, each flow guide member provided at a respective portion of the volume. Each flow guide member may be different to one another and each may be according to any of the examples described herein.

Optionally, the flow guide member is dimensioned such that less than 50% of the volume is empty space. In some examples, more than 50% of the volume is occupied by the fuel-handling component and the at least one flow guide member.

Optionally, the flow guide member is dimensioned such that less than 20% of the volume is empty space. In some examples, more than 80% of the volume is occupied by the fuel-handling component and the at least one flow guide member.

Optionally, the flow guide member is formed of a polyurethane foam. Polyurethane foam is lightweight which can be suitable for aviation purposes where weight is ideally reduced. Polyurethane foam is electrically insulative, so can reduce a risk of sparks which may otherwise be an ignition source. Polyurethane foam is straightforward to manufacture into complex geometries, which facilitates bespoke flow guide members to surround fuel-handling components.

Optionally, the aircraft structure further comprises at least one packing element formed of a reticulated foam, arranged within the volume, and at least partially surrounding the fuel-handling component.

The packing element "at least partially surrounding" the fuel-handling component, as used herein, refers to the packing element being proximate to the fuel-handling component relative to the overall scale of the volume of the aircraft structural element. The packing element may form a portion of, or all of, a bounding perimeter around the fuel-handling component for example. The packing element may span two or more non-parallel surfaces of the fuel-handling component such that the packing element partially encapsulates the fuel-handling component. The packing element may outsize the fuel distribution component in one or more dimensions. Where a plurality of packing elements are provided, each individual packing element may not itself outsize the fuel-handling component, but as a collection may form at least a portion of, or portions of, a boundary around the fuel-handling component to thereby at least partially surround the fuel-handling component. More generally, "at least partially surrounding" can be understood to refer to the packing element occupying volume in space around the fuel-handling component, for example into which fuel might leak from the fuel-handling component.

Optionally, the at least one packing element substantially fills an interspace of the volume between the fuel-handling component and the at least one aircraft structural element. That is, there is no or limited free space surrounding the fuel-handling component relative to when the packing element(s) are not provided. For instance, the packing element (s) may fill 90% of the available volume, or up to 95% of the available volume, or up to 100% of the available volume. In general, free space can accumulate leaked fuel and can present an ignition risk, therefore. Reduction of free space can correspond to a reduced ignition risk, such as by reducing a total quantity of leaked fuel which could accumulate.

Optionally, the at least one packing element comprises a surface conformal to an exterior surface of the fuel-handling component. That is, the packing element is shaped and dimensioned for a complementary fit with the fuel-handling component. This can allow for more effective packing of the volume to reduce free space, for example.

Optionally, the at least one packing element comprises a surface conformal to an interior surface of the at least one aircraft structural element defining the volume. That is, the packing element is shaped and dimensioned for a complementary fit with the surrounding aircraft structural element (s). This can allow for more effective packing of the volume to reduce free space, for example.

Optionally, the at least one packing element is attachable to the fuel handling component. This can prevent movement of the packing element(s) during flight, for instance.

Optionally, the at least one packing element is attachable to the at least one aircraft structural element. This can prevent movement of the packing element(s) during flight, for instance. In some examples, the at least one packing element is configured to not contact the fuel-handling component.

Optionally, the at least one packing element is a plurality of packing elements. Providing a plurality of packing elements can allow more geometrically complex volumes to be filled, for example, where a single packing element may not be able to fill such a volume.

Optionally, the plurality of packing elements are dimensioned to tesselate with each other to fill a portion of the volume. This can help substantially fill the volume, for example, which reduces free space and improves ignition suppression. Such a tessellating arrangement can provide structural stability to the packing elements and prevent their relative movement during flight, for example. In some examples, the packing elements have geometrically interlocking portions to facilitate their connection together such that multiple packing elements can be attached together to form a common body without provision of fasteners or adhesive, for example.

Optionally, a packing element of the plurality of packing elements is an access packing element, the access packing element being arranged proximate to an access panel in the aircraft structural element and dimensioned to be withdrawn through the access panel. In this way, the aircraft structure can provide an ignition-suppressed region around a fuel-handling component which is easily inspected via the access panel for maintenance purposes, as the access packing element can be removed via the access panel such that the fuel-handling component can be inspected.

Optionally, the access panel comprises an integrated packing element formed of reticulated foam and dimensioned to at least partially surround the fuel-handling component. In this way, the access panel and integrated packing element are both removed concurrently when the access panel is removed, which can simplify and speed-up inspection and maintenance of the fuel-handling component, for example. In other examples, the access panel comprises an integrated flow guide member in a similar fashion.

Optionally, the plurality of packing elements are each reversibly attachable to neighbouring packing elements. For example, Velcro or other reversible fastening elements may be used to secure neighbouring packing elements to one another.

Optionally, the packing elements are formed of polyurethane. Polyurethane foam is lightweight which can be suitable for aviation purposes where weight is ideally reduced. Polyurethane foam is electrically insulative, so can reduce a risk of sparks which may otherwise be an ignition source. Polyurethane foam is straightforward to manufacture into complex geometries, which facilitates bespoke packing elements to surround fuel-handling components.

Optionally, the fuel-handling component is a fuel distribution component. The fuel distribution component may have joining portions or valves which may be susceptible to leaks of fuel, even at a trace level. The fuel distribution component may be a pipe, for example. The fuel distribution component is configured to hold fuel internally within the fuel distribution component, and to transport fuel, held internally within the fuel distribution component, through the volume.

Optionally, the at least one aircraft structural element is an interspace of a wing. In some examples, the fuel-handling component is a distribution pipe and the aircraft structural element is an interspace of a wing through which the distribution pipe runs, distributing fuel from a fuel tank in the wing to a power generation system on the aircraft.

Optionally, the fuel-handling component is for handling hydrogen. Hydrogen is particularly flammable relative to typical aviation fuel and is also particularly prone to leaking due to its small molecular size, and so anti-leak measures must be more stringent. The present disclosure can improve viability of hydrogen-powered aircraft. In particular, the present disclosure may reduce or negate the need for alternative heavier systems for dealing with hydrogen leakage.

Optionally, the fuel-handling component is a hydrogen fuel cell.

In other examples, the present disclosure may be applied to fuel-handling components handling kerosene-type fuels like JET A-1 aviation fuel, or sustainable-aviation fuels.

A second aspect of the present invention provides an aircraft comprising the aircraft structure of the first aspect. That is, an aircraft having an aircraft structure, the aircraft structure comprising: at least one aircraft structural element defining a volume; a fuel-handling component arranged within the volume and configured to handle a fuel; a purging system comprising an inlet and an outlet, the purging system configured to provide a flow of purge gas from the inlet, through the volume, to the outlet, to thereby purge leaked fuel from the volume; and a flow guide member formed of a reticulated foam, arranged within the volume and externally to the fuel-handling component, and configured to guide the flow of purge gas within the volume.

The aircraft, in comprising the aircraft structure of the first aspect, is thereby operable with a reduced risk of an ignition event.

Optionally, the aircraft is a hydrogen-powered aircraft.

Optionally, the aircraft is a sustainable aviation fuel powered aircraft.

Optional features of any one of the aspects of the present invention may be applied equally to any other one of the aspects of the present invention, where appropriate.

The use of "first", "second", "third", "fourth" in the present disclosure are intended as convenient labels. Reference to a "second" element does not necessarily imply the existence of a "first" element, therefore.

BRIEF DESCRIPTION OF THE DRAWINGS

Embodiments of the invention will now be described, by way of example only, with reference to the accompanying drawings, in which:

FIGS. 4a, 4b, and 4c illustrates a cross-sectional schematic view of an aircraft structure, fuel distribution elements and packing elements according to the present disclosure;

DETAILED DESCRIPTION

Figure 1:
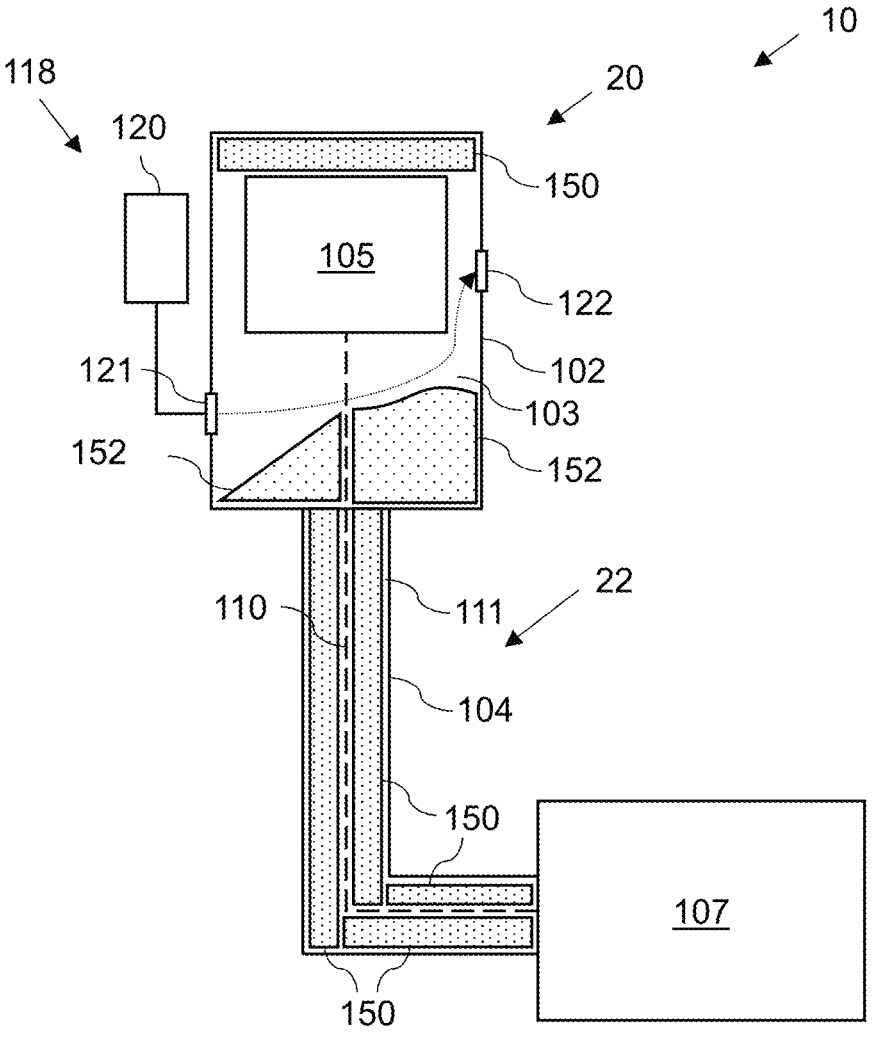
FIG. 1 shows a schematic view of aircraft structures according to the present disclosure.

FIG. 1 illustrates, schematically, a fuel-handling system 10 of an aircraft 1000 (depicted in FIG. 6) according to an example. The fuel-handling system 10 has fuel-handling components, which in this particular example include a fuel tank 107 and a power generator 105 fluidically connected by a fuel pipe 110. The depicted fuel-handling system 10 also includes packing elements 150 and flow guide members 152, which are provided around fuel-handling components of the fuel-handling system 10. The packing elements 150 and flow guide members 152 are reticulated foam devices.

The present disclosure is suitable for a variety of fuel sources and power generation architectures. In the example of FIG. 1, a hydrogen fuel system is considered, in which hydrogen is stored in the hydrogen fuel tank 107, distributed by the fuel pipe 110 and used by the power generator 105. Accordingly, the following discussion will largely be framed in the context of a hydrogen fuel-handling system. However, it will be understood that in other examples, the present disclosure may be used for conventional, Kerosene-based aircraft fuel such as Jet A or Jet A-1, and in particular for sustainable aviation fuels (SAFs).

Turning first to a first portion 20 of the fuel-handling system 10. The power generator 105 and a portion of the fuel pipe 110 are arranged within a first volume 103 defined by a first aircraft structural element 102.

The first aircraft structural element 102 is a portion of an aircraft, such as a part of an airframe of the aircraft 1000, which houses, or at least partially surrounds, fuel-handling components of the fuel-handling system 10. For example, the first aircraft structural element 102 may be a wing box or a part of a fuselage, and the power generator 105 arranged within the same. Whilst referred to as a single structural element for brevity, it will be understood that the first aircraft structural element 102 may comprise a plurality of individual structural elements which are fastened together, for example.

The power generator 105 is a device which consumes fuel to generate power. In the example of FIG. 1, the power generator 105 is a hydrogen fuel cell system which is operable to generate electrical power by combining hydrogen and air in the presence of a catalyst. As mentioned above, in other examples the power generator 105 may be a combustion-based engine which uses, for example, Kerosene-based fuel to generate power.

The fuel pipe 110 is a fuel-distribution element and carries, in this example, hydrogen fuel to the power generator 105.

There is a risk that the first volume 103 defined by the aircraft structural element 102 accumulates leaked fuel. Fuel may leak from the fuel pipe 110 and/or the power generator 105. Any amount of leaked fuel presents an ignition risk, but in particular increased concentrations of leaked fuel present an increased ignition risk. Accordingly, a purging system 118 is provided. The first aircraft structural element 102 comprises, fluidically connected to the first volume 103 defined by the first aircraft structural element 102, an inlet 121 and an outlet 122. A source of purge gas 120 can provide purge gas to the first volume 103 via the inlet 121, and this purge gas can be removed from the first volume 103 via the outlet 122. The source of purge gas 120 may provide the purge gas under pressure to encourage propagation through the first volume 103 defined by the first aircraft structural element 102, and/or flow generating components such as impellers may be provided at the inlet 121 and/or outlet 122, for example. In the event of fuel leaking from a fuel-handling component such as the fuel pipe 110 or power generator 105, the purge gas can remove the leaked fuel from the first volume 103 defined by the first aircraft structural element 102. The purge gas may be an inert gas, such as nitrogen.

A flow guide member 152 is provided within the first volume 103, in this example being placed proximate to the inlet 121. The flow guide member 152 is attached to walls of the first aircraft structural element 102 and fills a corner region of the first aircraft structural element 102. The flow guide member 152 may be attached by any appropriate method such as by mechanical fasteners or adhesives, for example. In some examples, the flow guide member 152 is removably attached via Velcro or some other reversible attachment system, which can allow the flow guide member 152 to be straightforwardly installed into and removed from the first volume 103. Attachment of the flow guide member 152 to the aircraft structural element 102 prevents the flow guide member 152 from excess movement during flight, for example.

The flow guide member 152 is dimensioned and positioned to aid the flow of purge gas through the first volume 103. For instance, the flow guide member has surfaces upon which a flow of purge gas is incident, and which are aligned relative to the flow of purge gas to deflect and thereby guide purge gas from the inlet 121 to the outlet 122. In particular, the surfaces of the flow guide member 152 may be conformal with an external surface of the pipe 110 or power generator 105. This can define a channel between the respective fuel-handling component (pipe 110 or power generator 105, in this example) and the flow guide member 152. The purge gas may predominantly flow through this channel. The skilled person will appreciate that techniques such as computational fluid dynamics can be used to model the flow of purge gas through the volume and determine a dimension and position for the flow guide member 152 (and potentially further flow guide members).

Compared to the first volume 103 without the flow guide member 152, the flow guide member 152 reduces unoccupied space within the first volume 103 in which leaked fuel could accumulate. The flow path of purge gas in the presence of the flow guide member 152 can thereby be concentrated, which can improve a flow rate and can improve removal of leaked fuel from the first volume 103.

A packing element 150 is positioned between the power generator 105 and a wall of the first aircraft structural element 102. The packing element 150 is positioned away from anticipated purge gas flow within the first volume 103, and reduces unoccupied space within the first volume 103.

As mentioned above, the flow guide member 152 and the packing element 150 are formed of a reticulated foam, in this example being formed of polyurethane. Reticulated foams can have flame-suppressant characteristics. This can suppress the risk of or magnitude of an ignition event. Furthermore, reticulated foams can be lightweight, which means their contribution to the overall weight of the aircraft can be minimal. Moreover, reticulated foams can be compressible, which can allow for their installation and removal from apertures smaller than the foam device in a non-compressed form. This can simplify maintenance and installation procedures. In other words, providing reticulated foam devices around the fuel-handling components can be a lightweight, straightforward means to reduce ignition risk from leaked fuel. By being formed of an electrically insulative reticulated foam, such as polyurethane, an ignition risk can be further reduced by reducing a risk of sparking from occurring. Furthermore, use of a reticulated foam can provide thermal insulation properties which can assist with thermal management, for example where a fuel needs to be transported at a different temperature to a surrounding environment, such a fuel provided at cryogenic temperatures.

Turning now to a second portion 22 of the fuel-handling system 10, which comprises a second aircraft structural element 104 defining a second volume 111 in which the fuel pipe 110 is arranged. The fuel pipe 110 fluidically connects the fuel tank 107 to the power generator 105. Accordingly, the fuel pipe 110 is a fuel-handling component, but also more specifically a fuel distribution component, in that it holds fuel and transports held fuel through the volume 111.

The second aircraft structural element 104 is, similar to the first aircraft structural element 102, a portion of the aircraft 1000, such as a part of an airframe of the aircraft 1000, which houses, or at least partially surrounds, fuel-handling components of the fuel-handling system 10. In particular, in the example of FIG. 1 the second aircraft structural element 104 is a portion of the wing, in particular a wing box of the wing.

The fuel pipe 110 is surrounded by a plurality of packing elements 150 which substantially fill the second volume 111. The packing elements 150 are dimensioned to tessellate with each other in order to fill the second volume 111. Examples of their relative arrangement are depicted in more detail in FIGS. 4a and 4b.

Similar to the first portion 20 of the fuel-handling system 10, in comprising packing elements 150 formed of reticulated foam the second portion 22 can benefit from ignition suppression. In particular, the second portion 22 illustrates the provision of reticulated foam packing elements in a volume around a fuel distribution component, in this example the fuel pipe 111.

FIGS. 2-4a-c illustrate further features of the present disclosure.

Figure 2:
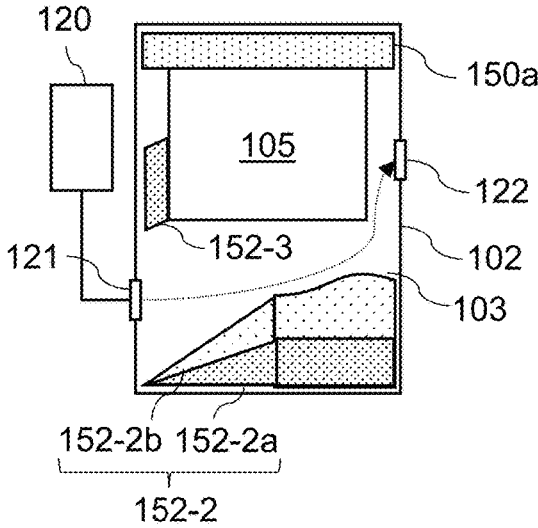
FIG. 2 shows a schematic view of an aircraft structure and a fuel-handling component with flow guiding members and packing elements according to the present disclosure.

FIG. 2 illustrates a substantially similar portion of a fuel-handling system to the first portion 20 illustrated by FIG. 1; differences therefrom will be described.

In the example of FIG. 2, a second flow guide member 152-2 is provided to play a similar role to the first flow guide member 152. The second flow guide member is formed from a first portion of foam 152-2a and a second portion of foam 152-2b. The first portion of foam 152-2a is more porous than the second portion of foam. As will be appreciated by the skilled person, porosity can be measured by a fraction of total volume $V_T$ and void volume $V_v$, such that porosity $$\phi = \frac{V_v}{V_T}.$$

The first portion therefore has a first value of porosity and the second portion has a second, lower value of porosity. Using foams of different porosity can allow foams with higher flame suppressing characteristics to be used in some regions of the volume, and foams with preferrable aerodynamic characteristics to be used in other regions, for example.

A third flow guide member 152-3 is attached to the power generator 105. More generally, the third flow guide member 152-3 illustrates that the flow guide members may be attached to either or both of the surrounding aircraft structural element 102 or fuel-handling components contained within. Similarly, a packing element 150a is provided in substantially the same place as the packing element described earlier in view of the first portion 20, but is attached to the power generator 105.

Figure 3:
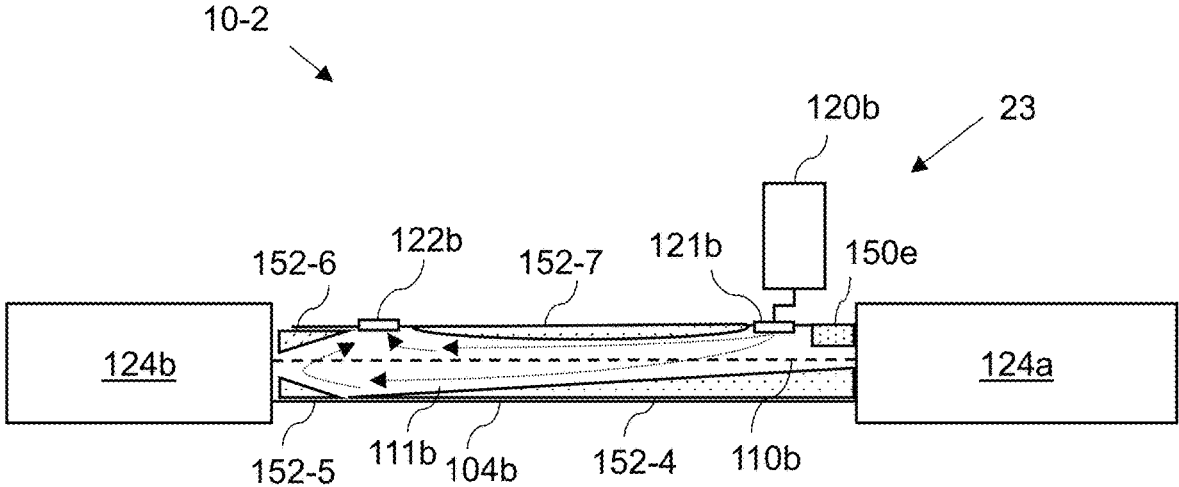
FIG. 3 shows a schematic view of an aircraft structure and a fuel distribution element with flow guiding members and packing elements according to the present disclosure.

FIG. 3 illustrates a portion of a fuel-handling system 10-2 in which a fuel pipe 110b joins a first fuel-handling device 124a to a second fuel-handling device 124b. The fuel pipe 110b is contained within a volume 111b defined by an aircraft structure 104b. Similarly to the second portion 22 illustrated in FIG. 1, the first fuel-handling device 124a may be a fuel tank and the second fuel-handling device 124b may be a power generator, but more generally the first and second fuel-handling devices represent two portions of the fuel-handling system 10-2 which are fluidically connected for the transfer of fuel therebetween. In the example of FIG. 3, a purging system is provided, similar to that in FIG. 1, in which a source of purge gas 120b provides purge gas to an inlet 121b in the aircraft structural element 104b which is subsequently removed from the volume 111b at an outlet 122b. A plurality of flow guide members 152-4, 125-5, 152-6, 152-7 are provided, each being able to guide at least a portion of the flow of purge gas through the volume 111b. Each flow guide member, 152-4, 152-5, 152-6, 152-7 is formed of a reticulated foam to provide the ignition suppression described above. A packing element 150e is also provided, which is not anticipated to substantially alter the flow of purge gas, but nevertheless occupies a region of the volume 111b and provides further ignition suppression.

FIG. 4a illustrates a cross-sectional view of an aircraft structural element 104c defining a volume 111c which contains a fuel pipe 110c according to a further example. The fuel pipe 110c is surrounded by a first packing element 150-1 and a second packing element 150-2. Similar to the second flow guide member 152-2 of FIG. 2, the first and second packing elements 150-1, 150-2 are each formed of two respective reticulated foam portions having different porosities. Considering the first packing element 150-1, a first portion 150-1a of the first packing element 150-1 comprises a curved surface 157 which is conformal with an exterior surface of the fuel pipe 110c, the fuel pipe 110c being substantially circular in cross-section. Accordingly, a channel 141 surrounding the fuel pipe 110c is defined by the first and second packing elements 150-1a, 150-1b, wherein the channel 141 is free space and the packing elements 150-1a, 150-1b are not in contact with the fuel pipe 110c. A second portion 150-1b of the first packing element 150-1 is arranged to fill corner portions of the aircraft structural element 104c. The first portion 150-1a may be formed from a reticulated foam in which conformal surfaces of potentially complex geometries are more easily formed, for example, whereas the second portion 150-1b may be formed from a reticulated foam which provides for more structural strength for attachment to walls of the aircraft structural element 140c, for example. Porosities of the portions 150-1a, 150-1b may additionally or alternatively be selected based on aerodynamic performance where a purging gas flow is present, for instance, even if the packing elements 150-1, 150-2 are not primarily intended for guiding flow of the purging gas. The second packing element 150-2 is substantially similar to the first packing element 150-1, but provided on an opposite side of the fuel pipe 110c and hence provided in a mirrored arrangement with respect to the fuel pipe 110c. Each of the packing elements 150-1, 150-2 comprises fastening portions 144, such as Velcro strips, which permit the packing elements 150-1, 150-2 to be fastened together. The provision of fastening portions 144 can facilitate the packing elements remaining in a desired position during flight, for example. In the example of FIG. 4a, the fuel pipe 110c occupies at least 20% of the volume 111c defined by the aircraft structural element 104c, in that aircraft structural element 104c defines a relatively tight housing for the fuel pipe 110c. The packing elements occupy at least 90% of the remaining volume of the aircraft structural element 104c, ignoring that occupied by the fuel pipe 110c. In this way, much of the free space which may have otherwise existed has been filled with flame-suppressing reticulated foam, which can suppress a risk of ignition here. By using multiple foam packing elements to fill the volume of the aircraft structural element 104c, the multiple foam packing elements may be each removable from the volume when the volume 111c needs to be emptied for maintenance or inspection purposes, for example.

In some examples, it is desirable to access fuel-handling components from an external position to perform inspection and/or maintenance. FIGS. 4b and 4c illustrate a yet further example of an aircraft structural element 104d defining a volume 111d which houses a fuel pipe 110d. The aircraft structural element 104d comprises an access port 160 which forms part of an external wall of the aircraft structural element 104d, as seen in FIG. 4b. The access port 160 can be removed, or in examples opened or more generally reconfigured, to allow inspection of the volume 111d inside of the aircraft structural element 104d, and in particular to inspect the fuel pipe 110d. Packing elements 150-a, 150-b, 150-c, 150-d are provided within the volume in accordance with the principles described previously, and in particular are dimensioned to tesselate within the volume 111d surrounding the fuel pipe 110d to substantially fill free portions of the volume 111d. In particular, a keystone packing element 150-a is integrally formed with the access port 160 such that when the access port 160 is removed, the keystone packing element 150-a is removed therewith to allow external access to and inspect of the fuel pipe 110d. In particular, the keystone packing element 150-a may be removed and the fuel pipe 110d inspected without requiring removal of other packing elements 150-b, 150-c, 150-d, which can improve speed of maintenance operations, for example. In other examples, the keystone packing element 150-a may not be integrally formed with, or attached to, the access port 160, but may nevertheless be dimensioned and positioned for straightforward removal from the access port 160 to allow inspection of the fuel pipe 110*d*.

Such an approach of integrating foam devices, such as a flow guide member or other packing element, within access ports could be adopted for other fuel-handling components, and is not limited to fuel distribution elements.

The packing elements 150-*a*, 150-*b*, 150-*c*, 150-*d*, 150-1, 150-2 illustrated in FIGS. 4*a*-4*c* are dimensioned and shaped to fill substantially all, such as more than 95% of, the free volume surrounding the fuel pipe 110*c*, 110*d*. In this way, movement of the packing elements 150-*a*, 150-*b*, 150-*c*, 150-*d*, 150-1, 150-2 relative to the fuel pipe 110*c*, 110*d* may be prevented without requiring additional securing means. In some such examples, the packing elements may be in a partially compressed state whilst stored within the volume such that they exert a force on the surrounding aircraft structural element(s) and/or fuel-handling component in order to retain their position.

FIG. 4*b* also illustrates that the packing elements need not form a conformal surface with respect to the fuel pipe 110. In the example of FIG. 4*b*, the packing elements 150-*a*, 150-*b*, 150-*c*, 150-*d* form an enclosure with a substantially square or rectangular cross-section around the circular fuel pipe 110.

Figure 5:
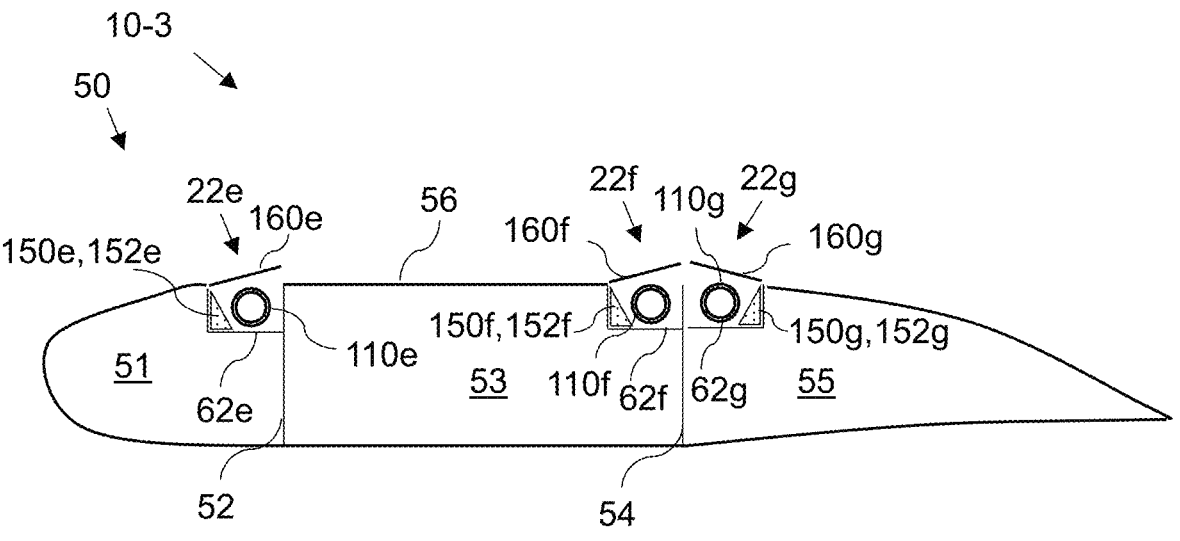
FIG. 5 illustrates a cross-sectional schematic view of an aircraft wing according to the present disclosure.

FIG. 5 illustrates a cross-section of an aircraft wing 50, according to an example, comprising a wing cover 56 defining external surfaces of the aircraft wing 50, a leading edge spar 52 and a trailing edge spar 54 defining a leading edge portion 51, a central wing box portion 53 and a trailing edge portion 55. A first portion 22*e* of a fuel-handling system 10-3 is disposed in the leading edge portion 51 of the wing, a second portion 22*f* of the fuel-handling system 10-3 is disposed in the central wing box portion 53 of the wing, and a third portion 22*g* of the fuel-handling system 10-3 is disposed in the trailing edge portion 55 of the wing.

Each portion 22*e,f,g* of the fuel-handling system comprises respective channel walls 62*e,f,g* defining volumes housing fuel distribution components 110*e,f,g* and foam devices, such a flow guide members 152*e,f,g* or packing elements 150*e,f,g*, in accordance with the reticulated foam flow guide members and reticulated foam packing elements described previously. That is, the channel walls 62*e,f,g* are aircraft structural elements define respective volumes and act as respective enclosures for the fuel distribution components 110*e,f,g*. Each enclosure is smaller than the respective leading edge portion 51, central wing box portion 53 or trailing edge portion 55. Each portion 22*e,f,g* of the fuel-handling system can be continually washed with purge gas by provision of a purging system (not pictured), as described earlier.

Each portion 160*e,f,g* is accessible via a respective access panel 22*e*, 22*f*, 22*g* provided in the wing cover 56, wherein each access panel 22*e*, 22*f*, 22*g* may comprise an integrally formed foam device(s) such as the packing elements and/or flow guide members described earlier.

Each portion 160,*e,f,g* describes a possible arrangement for a fuel distribution component through the aircraft wing 50. Other arrangements are possible whilst utilising the reticulated foam flow guide members and/or packing elements as described herein. For instance, just a single portion comprising a single fuel distribution component may be present. A portion may not have an access panel in a surface of the wing, and may be located more centrally within the wing, for example.

Figure 6:
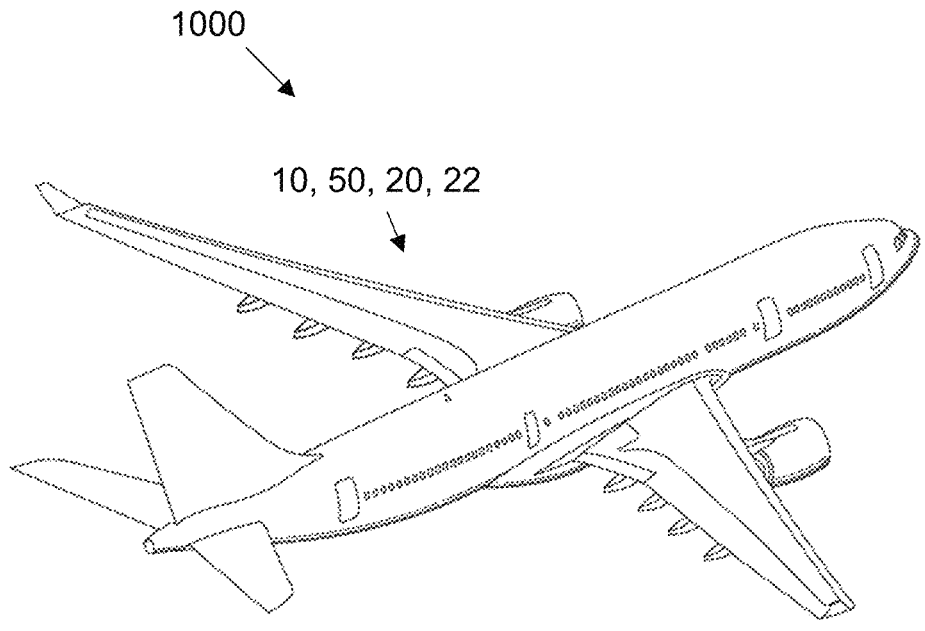
FIG. 6 illustrates a schematic view of an aircraft comprising an aircraft structure according to the present disclosure.

FIG. 6 illustrates the aircraft 1000 comprising a fuel-handling system 10 including at least the first 20 and second portion 22 described earlier, and an aircraft wing 50 in accordance with the one illustrated by FIG. 5. The aircraft 1000, in comprising reticulated foam members such as the packing elements 150 and flow guide members 152, can benefit from lower risk of an ignition event, and can do so in a lightweight manner. Furthermore, inspection of the fuel-handling system 10 of the aircraft 1000 is straightforward due to the compressible and removable nature of the packing elements 150 and flow guide members 152. Fuel distribution elements which run through the aircraft 1000, such as in the wing 50, can be continually washed with purge gas to prevent or reduce accumulation of leaked fuel. The aircraft 1000, or aircrafts more generally in accordance with the present disclosure, may comprise any of the fuel-handling systems described herein.

Above embodiments are to be understood as illustrative examples of the invention. Further embodiments of the invention are envisaged:

Whilst the illustrated examples have described flow guide members used in conjunction with fuel pipes and power generators, it will be appreciated that the use of flow guide members can extend to any part of a fuel-handling system which might be in a purged environment. For instance, the flow guide members may be used in an aircraft structure defining a volume in which any fuel-handling component is present, wherein the fuel-handling component may be a pump, valve, fuel tank, processing equipment, and the likes.

In the illustrated examples, for explanatory clarity only single fuel distribution components have been illustrated in example. For instance, the examples illustrate a single fuel pipe running through a volume. The skilled person will appreciate that two or more fuel distribution components, or fuel-handling components more generally, may be present in a volume defined by an aircraft structural element, and flow guide members and/or packing elements formed of reticulated foam provided therewith in accordance with the present disclosure.

Material qualities described in view of the packing elements, which are formed of reticulated foam, will be understood to apply to the flow guide members, and vice versa, where appropriate. For example, the packing elements being compressible and removable through an aperture in a compressed state will be understood to apply to a flow guide member.

In the illustrated examples, fuel-handling components are surrounded by packing elements such that greater than 90% of free space within the volume defined by the aircraft structural element(s) is occupied. Such a description can be understood to refer to the overall spatial footprint of a packing element, without considering the free space existing in the reticulated foam cells, for example. In examples, greater than 95% of free space is occupied. In examples, greater than 50% of free space is occupied, such as greater than 55%, 60%, 65%, 70%, 75%, 80%, or 85%.

In some of the illustrated examples, packing elements have been provided in conjunction with flow guide members. In some examples, only flow guide members are provided. In other examples, only packing elements are provided. In examples, a plurality of packing elements and/or a plurality of flow guide members may be provided.

It is be understood that any feature described in relation to any one embodiment may be used alone, or in combination with other features described, and may also be used in combination with one or more features of any other of the embodiments, or any combination of any other embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. An aircraft structure comprising:
at least one aircraft structural element defining a volume;
a fuel-handling component arranged within the volume and configured to handle a fuel;
a purging system comprising an inlet and an outlet, the purging system configured to provide a flow of purge gas from the inlet, through the volume, to the outlet, to thereby purge leaked fuel from the volume; and
a flow guide member formed of a reticulated foam, arranged within the volume and externally to the fuel-handling component, and configured to guide the flow of purge gas within the volume.

2. The aircraft structure according to claim 1, wherein the flow guide member comprises a first portion and a second portion, the first portion formed of a more porous reticulated foam than the second portion.

3. The aircraft structure according to claim 2, wherein the first portion is arranged nearer the purge gas flow than the second portion.

4. The aircraft structure according to claim 1, wherein the flow guide member is attached to the aircraft structural element.

5. The aircraft structure according to claim 1, wherein the flow guide member is attached to the fuel-handling component.

6. The aircraft structure according to claim 1, wherein the flow guide member is configured to be removable from the volume.

7. The aircraft structure according to claim 1, wherein the flow guide member has a surface which is shaped to be conformal with an exterior surface of the fuel-handling component, and arranged relative to the fuel-handling component such that the flow of purge gas is guided between the surface of the flow guide member and the exterior surface of the fuel-handling component.

8. The aircraft structure according to claim 1, wherein the flow guide member is arranged to fill a corner region of the volume.

9. The aircraft structure according to claim 1, wherein the flow guide member is a first flow guide member of a plurality of flow guide member, each flow guide member provided at a respective portion of the volume.

10. The aircraft structure according to claim 1, wherein the flow guide member is dimensioned such that less than 50% of the volume is empty space.

11. The aircraft structure according to claim 1, wherein the flow guide member is dimensioned such that less than 20% of the volume is empty space.

12. The aircraft structure according to claim 1, wherein the flow guide member is formed of a polyurethane foam.

13. The aircraft structure according to claim 1, further comprising at least one packing element formed of a reticulated foam, arranged within the volume and at least partially surrounding the fuel-handling component.

14. The aircraft structure according to claim 1, wherein the fuel-handling component is a fuel distribution component.

15. The aircraft structure according to claim 14, wherein the at least one aircraft structural element is an interspace of a wing.

16. The aircraft structure according to claim 1, wherein the fuel-handling component is for handling hydrogen.

17. The aircraft structure of claim 16, wherein the fuel-handling component is a hydrogen fuel cell.

18. An aircraft comprising the aircraft structure of claim 1.

* * * * *